Mar. 3, 1925. 1,528,384
A. SEELEY ET AL
SPINDLE OF SPINNING, DOUBLING, AND WINDING MACHINES
Filed May 9, 1923
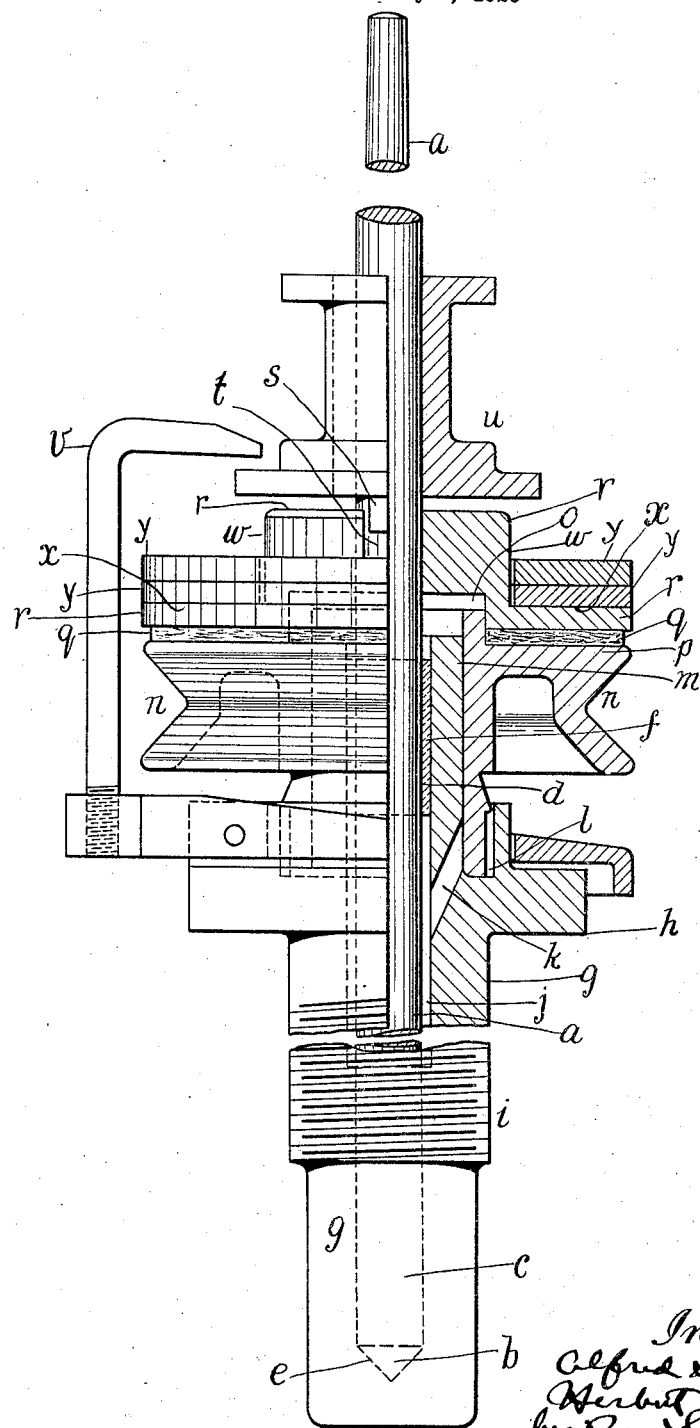

Patented Mar. 3, 1925.

1,528,384

UNITED STATES PATENT OFFICE.

ALFRED SEELEY AND HERBERT HOLT, OF ROCHDALE, ENGLAND.

SPINDLE OF SPINNING, DOUBLING, AND WINDING MACHINES.

Application filed May 9, 1923. Serial No. 637,722.

*To all whom it may concern:*

Be it known that we, ALFRED SEELEY, a subject of the King of the United Kingdom of Great Britain and Ireland, and resident of Melrose House, Bentmeadows, Rochdale, in the county of Lancaster, England, and HERBERT HOLT, a subject of the King of the United Kingdom of Great Britain and Ireland, and resident of Quarry Hill, Heights Lane, Rochdale, in the county of Lancaster, England, have invented new and useful Improvements Relating to the Spindles of Spinning, Doubling, and Winding Machines, of which the following is a specification.

This invention relates to spindles of the kind described in the specification of the Letters Patent No. 996,530, dated June 27th, 1911, granted to us, characterized essentially in that the carrying part for carrying yarn or thread for example, a spindle blade being revolubly mounted in a footstep and any other requisite bearing of a bolster with inner or outer bearings is made to receive motion through a friction transmitting device, for example a flange or collar in driving connection with it and movable lengthwise thereof so as never to bear the weight of said carrying part or yarn or thread thereon, which friction transmitting device bears by its weight upon a friction pad carried by a driving part, for example a wharve or wharve or pulley carried and revoluble on the outer bearing of the bolster to drive the carrying part and always out of contact with the carrying part. The present invention consists in a spindle of the said kind wherein the friction transmitting device is shaped to receive optional addition of weight and additional weight is provided for optional addition so that the friction transmitting device may be adjusted in weight from time to time to bear on the frictional pad with any weight requisite in accordance with the fineness or coarseness of yarns or threads to be wound or the tension under which yarns or threads are to be wound and only a number of weights applicable to any of a number of similar spindles are required in addition to the friction transmitting devices provided once for all on the spindles obviating the inconvenience and cost of the provision heretofore made with such spindles for the like object of friction transmitting devices of different masses for use at different times requiring two or more sets of a large number of parts to be provided for a machine of which only one set could be used at a time.

The accompanying drawing, showing an illustrative embodiment of this invention, is in part a side elevation and in part a vertical section of a spindle of the kind aforesaid provided according to this invention with means for adjusting in weight the flange or collar to bear upon the friction pad.

In the spindle illustrated in the drawing, $a$ is the spindle blade with a conical foot $b$ and adjacent taper portion $c$ at the lower end and higher up a cylindrical part $d$ or upper journal to fit respectively a footstep $e$ and upper bearing $f$ provided in the bolster $g$ which is adapted to be mounted in a rail being furnished with a flange $h$ to rest upon the rail and with screw-threads $i$ to receive a nut by which it may be secured in position. The bolster $g$ is shown as formed to provide a cavity $j$ for lubricant in communication by a passage $k$ with an annular channel $l$ formed around the exterior of the bolster $g$ around the lower end of a cylindrical part $m$ so that the cylindrical part $m$ and annular channel $l$ form an outer bearing on which the wharve or pulley $n$ may be revolved always out of contact with the spindle blade $a$. The wharve or pulley $n$ is provided in the ordinary way with a central collar or boss $o$ and a flat surface $p$ surrounding it in order that the washer $q$ of flannel or other suitable material may be kept in place. $r$ is the flange or collar forming a friction transmitting device to bear against the friction pad $q$ such as a flannel or other washer and in engagement in a usual way with the spindle blade $a$ by means of keys or projections $s$ entering notches $t$ in the flange or collar $r$ so that the flange or collar $r$ may be moved lengthwise of the spindle blade $a$ while the spindle blade $a$ and collar $r$ must always turn together. Only one notch $t$ and one key or projection $s$ are shown. The keys or projections $s$ are formed on the grooved collar $u$ provided in a usual way on the spindle blade $a$ for a few coils of yarn to be wound around it in order to be attached to the spindle blade $a$ in preparation for the commencement of the winding of yarn on to or into empty or new bobbins or bodies of yarn when full bobbins or completed bodies of yarn have been removed from the spindle. $v$ is a pivoted hook of ordinary form for holding the spindle blade against accidental removal from its bearings.

For the purpose of this invention the flange or collar $r$ is formed with a central boss or projection $w$ and an annular flat face $x$ surrounding it around and on which annular weights $y$ two of which are shown may be placed so as to be held approximately concentric with a flange or collar $r$ and coaxial with the spindle blade $a$. Any appropriate number of annular weights $y$ of any appropriate thickness or thicknesses may be used so that by the addition or removal of one or more or all of them it is easy to adjust in any way requisite the weight or pressure by which the collar or flange $r$ bears upon the friction pad or washer $q$ and so the friction available for transmitting motion from the wharve or pulley $n$ to the spindle blade $a$.

What we do claim as our invention and desire to secure by Letters Patent is:—

1. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part and movable in the direction of the length thereof and bearing on the frictional pad and shaped to have a weight applied to it and a weight for optional application thereto and removal therefrom.

2. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part, and movable in the direction of the length thereof and bearing on the frictional pad, and shaped to have weights applied to it and a plurality of weights for optional application thereto and removal therefrom.

3. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part, and movable in the direction of the length thereof and bearing on the frictional pad and shaped in its upper face, to have an annular weight applied to it and an annular weight for optional application thereto and removal therefrom.

4. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part, and movable in the direction of the length thereof and bearing on the frictional pad and shaped in its upper face, to have annular weights applied to it and a plurality of annular weights for optional application thereto and removal therefrom.

5. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part and movable in the direction of the length thereof and bearing on the frictional pad and presenting on its upper face, a central projection around which an annular weight may be applied and an annular weight for optional application around and removal from such central projection and to and from such friction transmitting device.

6. In a spindle, a bolster having a footstep, an inner and an outer bearing, a carrying part arranged to revolve within the bolster, a driving part revolubly supported on the outer bearing, a frictional pad carried on the driving part and a friction transmitting device in driving connection with the said carrying part and movable in the direction of the length thereof and bearing on the frictional pad, and presenting on its upper face, a central projection around which annular weights may be applied and a plurality of annular weights for optional application around and removal from such central projection and to and from the friction transmitting device.

In testimony, that we claim the foregoing as our invention, we have signed our names this twenty-fourth day of April, 1923.

ALFRED SEELEY.
HERBERT HOLT.